United States Patent [19]

Ichinose et al.

[11] Patent Number: 4,933,793
[45] Date of Patent: Jun. 12, 1990

[54] MAGNETIC DISC DRIVE

[75] Inventors: Harunobu Ichinose; Katsuori Murata, both of Tokyo, Japan

[73] Assignee: Copal Company Limited, Tokyo, Japan

[21] Appl. No.: 275,490

[22] Filed: Nov. 23, 1988

[30] Foreign Application Priority Data

Dec. 2, 1987 [JP] Japan .................. 62-303271

[51] Int. Cl.⁵ .............................. G11B 5/56
[52] U.S. Cl. ....................... 360/109; 360/106; 360/130.34
[58] Field of Search ............ 360/109, 102–104, 360/106, 128, 130.3, 130.34, 99.01; 358/906, 909

[56] References Cited

U.S. PATENT DOCUMENTS 4,599,666 7/1986 Liu et al. ...................... 360/106
4,794,482 12/1988 Horio et al. ................... 360/104 X
4,833,556 5/1989 Kosaiko et al. ................ 360/102

*Primary Examiner*—David J. Severin
*Attorney, Agent, or Firm*—Finnegan, Henderson, Farabow, Garrett and Dunner

[57] ABSTRACT

A magnetic disc drive in which two magnetic heads, each of which has at least two magnetic gaps, are provided on a single carriage and radially spaced apart from each other by a first predetermined distance. A radially inner one of the two magnetic heads is tilted at a first predetermined angle toward a rotary shaft with which the magnetic disc is engaged, and a radially outer one of the two magnetic heads is tilted at a second predetermined angle away from the rotary shaft, thereby bringing the magnetic gaps provided on the inner and outer peripheral heads into contact with a recording/playback surface of the magnetic disc when the disc is rotated.

4 Claims, 3 Drawing Sheets

MAGNETIC DISC DRIVE

BACKGROUND OF THE INVENTION

This invention relates to a magnetic disc drive having a plurality of magnetic heads.

Electronic still video cameras have been developed in which still color picture information resulting from photography is electrically recorded on a magnetic disc referred to as a still video floppy. Since the amount of image information recorded on the magnetic disc used in an electronic still video camera is small, resolution is poor when a camera output is reproduced as still picture. There are cases where such poor resolution cannot be accepted.

Accordingly, in order to increase the amount of image signal information, it has been contemplated to use an image pick-up element having a large number of pixels and to increase the number of video disc tracks per image. To this end, it has been proposed to provide a magnetic head having four magnetic gaps for four tracks on a magnetic disc in order to record on or playback these tracks simultaneously. However, a magnetic disc is rotated at a high speed of 3600 rpm. In order to maintain good contact between the magnetic gaps of the magnetic head and the recording surface of the magnetic disc during this high-speed rotation, it is required that a stabilizer formed to have an opening extending in the radial direction of the disc be disposed on the side of the disc opposite its recording surface, and that the magnetic disc be brought into contact with the magnetic head by this stabilizer.

On the other hand, the surface of the magnetic head is formed to be spherical in order to assure good contact between the magnetic head and the magnetic disc. When such a magnetic head is used, it is difficult to record or play back image information with just one magnetic head having four magnetic gaps by using the stabilizer.

More specifically, since the magnetic disc contacted by the head tends to flex, only a portion of the head contacts the magnetic disc recording surface and it is very difficult to bring all four of the magnetic gaps into uniform contact with the recording surface. As a result, it is substantially impossible to make inputs and outputs to and from the magnetic disc. Accordingly, an arrangement has been proposed in which, say, two magnetic heads each having two magnetic gaps are provided and spaced apart a predetermined distance and the aforementioned stabilizer is used to assure contact between the magnetic disc and each of the magnetic heads.

However, with this arrangement in which the stabilizer is provided for the two magnetic heads each having the two magnetic gaps, a problem that arises is that uniform contact cannot be achieved between each of the magnetic gaps and the magnetic disc. That is, when the surface of each magnetic head on which the magnetic gaps are disposed (namely the head top) is provided perpendicular to the magnetic disc recording surface, as in the case where there is a single magnetic head, the disc is caused to flex by the top of one magnetic head and this flexure affects the other magnetic head, as a result of which the two heads do not contact the recording surface uniformly. Consequently, inputs and outputs cannot be made without an inclination at the magnetic gaps of the two magnetic heads having the two magnetic gaps.

SUMMARY OF THE INVENTION

Accordingly, an object of the present invention is to provide a magnetic disc drive in which, when a stabilizer is provided for two magnetic heads each having at least two magnetic gaps, inputs and outputs can be made in highly reliable fashion by achieving uniform contact between each magnetic gap and the recording surface of the magnetic disc.

According to the present invention, the foregoing object is attained by providing a magnetic disc drive in which two magnetic heads, each of which has at least two magnetic gaps, are provided on a single carriage and radially spaced apart from each other by a first predetermined distance. This magnetic disc drive is characterized in that a radially inner one of the two magnetic heads is provided on the carriage and tilted at a first predetermined angle toward a rotary shaft with which the magnetic disc is engaged, and a radially outer one of the two magnetic heads is provided on the carriage and tilted at a second predetermined angle away from the rotary shaft, thereby bringing the magnetic gaps provided on the inner and outer peripheral heads into contact with a recording/playback surface of the magnetic disc.

As a result of this arrangement, all of the magnetic gaps provided on the first and second peripheral magnetic heads can be brought into stable contact with the recording/playback surface of the magnetic disc.

In accordance with the present invention as described above, when the magnetic disc is rotated and the magnetic gaps on the first head and second head contact the recording/playback surface of the magnetic disc, all of the magnetic heads contact or approach the recording/playback surface of the disc substantially uniformly. This makes possible stable input/output of information.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
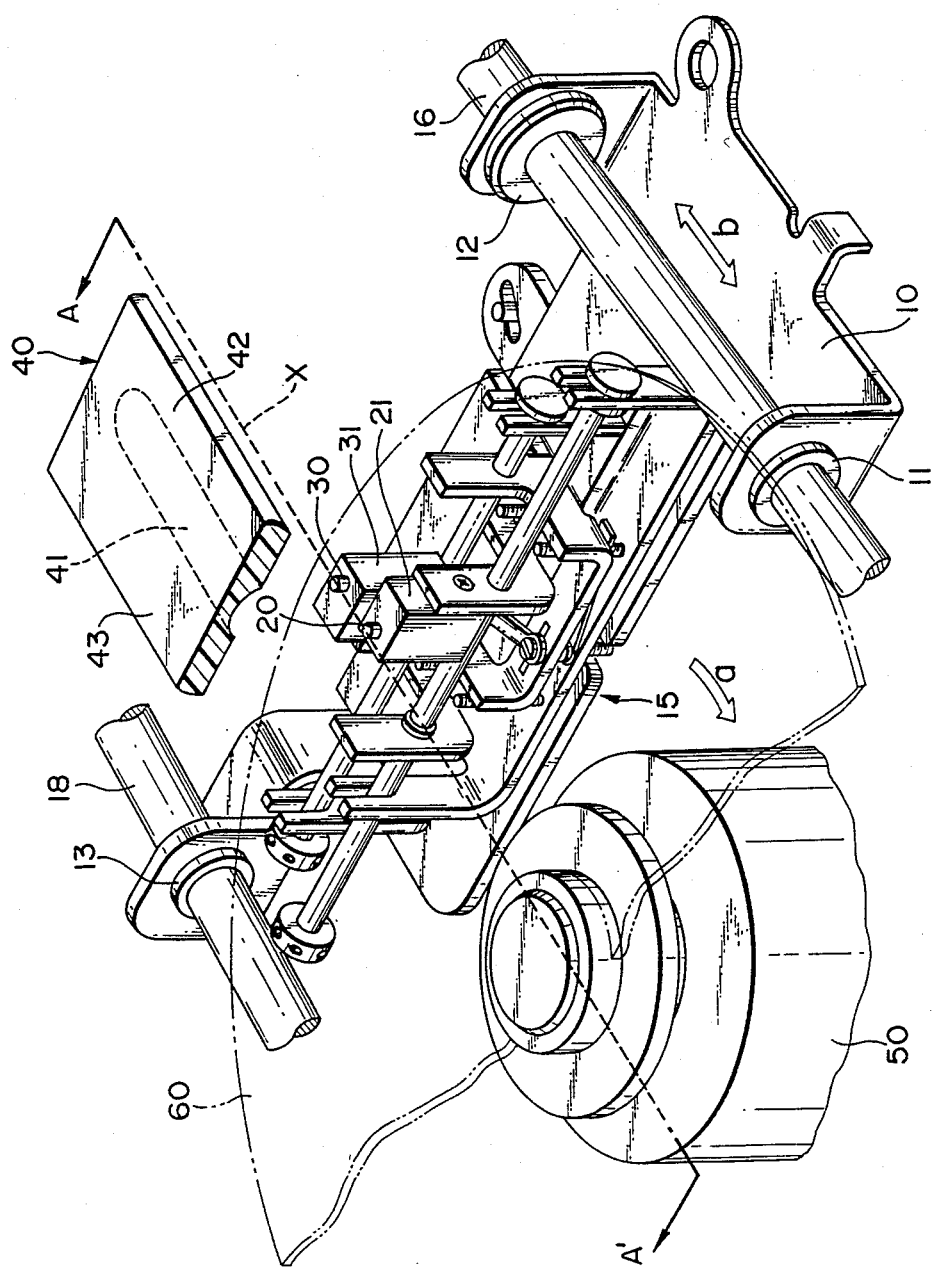
FIG. 1 is a partially cut away perspective view showing an embodiment of a magnetic disc drive according to the present invention.

FIG. 1 is a partially cut away perspective view showing an embodiment of a magnetic disc drive according to the present invention. A magnetic disc 60 is engaged with a rotary shaft 50 of a disc drive mechanism, not shown, provided on a base, also not shown. The magnetic disc 60, which is rotated at a speed of 3600 rpm in the direction of the arrow a, is accommodated inside a jacket (not shown) in order to protect its recording surface.

Guide shafts 16, 18 are provided on the base (not shown) so as to lie parallel to a straight line X, indicated by the dashed line, extending in the radial direction starting from the central axis of the rotary shaft 50.

Bearings 11, 12, 13 are press-fitted into upstanding portions formed at three locations of the carriage 10. The guide shaft 16 is passed loosely through the bearings 11, 12, and the guide shaft 18 is passed loosely through the bearing 13. Thus, the carriage 10 may be guided in freely slidable fashion in a direction parallel to the straight line X. The carriage 10 is driven back and forth in the direction of arrow b by a carriage drive mechanism, not shown, so that magnetic heads, described below, may be moved to predetermined tracks on the recording surface of the magnetic disc 60. A magnetic head adjusting mechanism 15 is provided substantially at the central portion of the carriage 10. A holding member 21 for holding an inner head 20 and a holding member 31 for holding an outer head 30 are mounted on the adjusting mechanism 15 so as to be independently adjustable. The inner head 20 is located closer to the central axis of the shaft 50 than the outer head 30; hence, the terms "inner" and "outer", respectively, are used. The inner head 20 and the outer head 30 are capable of having their amount of projection, inclination, recording position and azimuth adjusted relative to the recording surface of the magnetic disc 60, and of being fixed after adjustment. The heads 20, 30 are driven along the straight line X.

A stabilizer 40 is provided on the side of the magnetic disc 60 opposite its recording surface and acts to stabilize the state in which inner head 20 and outer head 30 contact or approach the recording surface of the magnetic disc 60 during its rotation. The stabilizer 40 has a length equivalent to the range of movement of the inner head 20 and outer head 30 and is formed to include sliders 42, 43 having sufficient curvature at the corner portions of surfaces which contact the magnetic disc 60, and a recess 41 at its central portion centered on the straight line X. A reaction force produced when the inner head 20 and outer hand 30 contact the recording surface of the disc is received by the sliders 42, 43 and the recess 41.

Owing to provision of the stabilizer 40, an air layer is formed between the magnetic disc 60 and stabilizer 40 when the magnetic disc 60 is rotated at the high speed of 3600 rpm. This air layer prevents the stabilizer from directly contacting the disc and, hence, prevents both stabilizer and disc wear.

Figure 2:
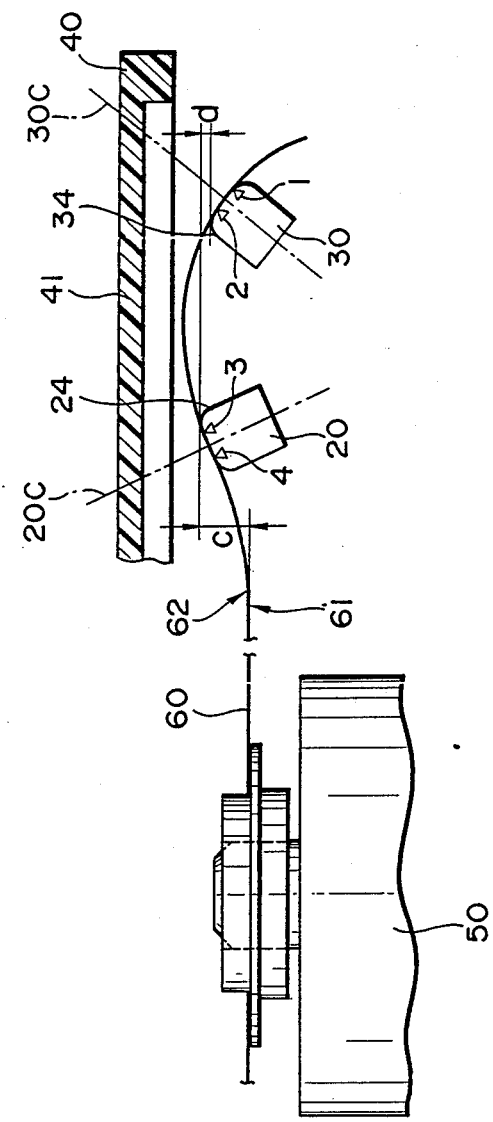
FIG. 2 is a sectional view taken along line A–A' of the magnetic disc drive shown in FIG. 1.
Figure 3:
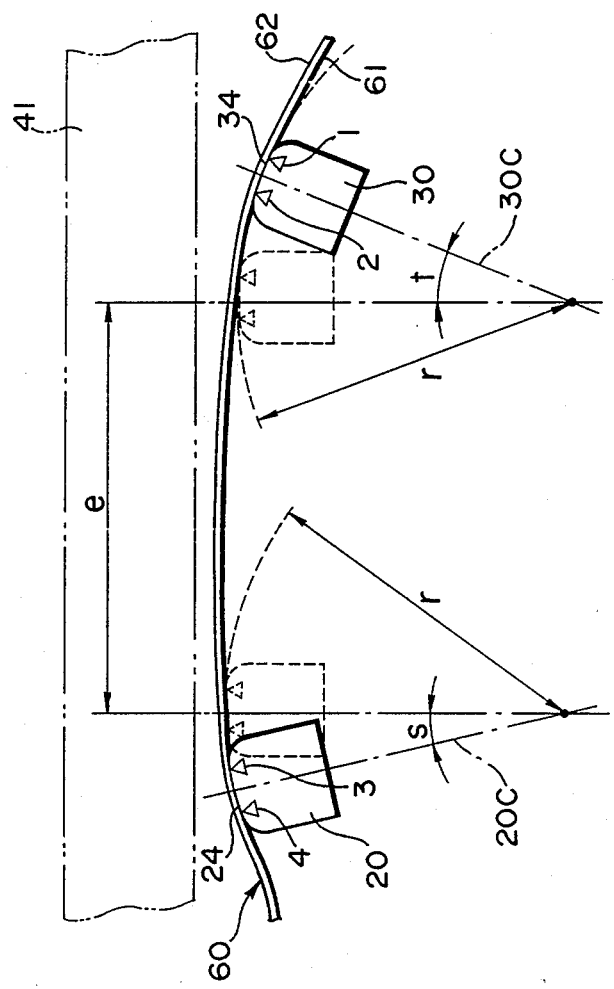
FIG. 3 is a sectional view partially taken along line A–A' of the magnetic disc drive shown in FIG. 1.

FIGS. 2 and 3 are sectional views taken along line A-A' of the magnetic disc drive shown in FIG. 1. The outer head 30 is provided with two magnetic gaps 1, 2 at positions symmetrical with respect to a center line 30C, and the inner head 20 is provided with two magnetic gaps 3, 4 at positions symmetrical with respect to a center line 20C. Magnetic gap surfaces 24, 34 of the magnetic heads on which the magnetic gaps 1, 2, 3, 4 are provided are each ground to have a spherical shape of radius r so that these surfaces may smoothly contact a recording surface 61 of the magnetic disc 60. The stabilizer 40, which is for stabilizing the magnetic disc 60 during operation, is provided above a base surface 62 of the magnetic disc 60, which is located on the side opposite the recording surface 61.

As shown in FIG. 2, the magnetic gap surface 24 of the inner head 20 is arranged to protrude by an amount, indicated at c, beyond the planar magnetic disc surface formed mainly by the action of centrifugal force when the magnetic disc 60 is rotated upon being engaged with the rotary shaft 50. The magnetic gap surface 34 of the outer magnetic head 30 is arranged to be lower than the magnetic gap surface 24 of the inner head 20 by an amount indicated at d.

As shown in FIG. 3, after the inner head 20 and outer head 30 are initially arranged (as illustrated by the dashed lines) so that their respective center lines 20C, 30C are spaced apart by a distance indicated at e, the inner head 20 is tilted toward the rotary shaft 50 through an angle s, and the outer head 30 is tilted away from the rotary shaft through an angle t. The heads 20, 30 are then fixed at these attitudes.

When the magnetic disc 60 is engaged with the rotary shaft 50 and rotated to attain a predetermined high speed, the stabilizer 40 on one side of the disc and the inner and outer heads 20, 30 on the other side are moved by a moving mechanism (not shown) while embracing the disc, thereby performing a read/write operation with respect to the disc. At this time the magnetic disc 60 is deformed in such a manner that all of the magnetic gaps 1, 2, 3, 4 are capable of contacting the recording surface 61 substantially uniformly. This assures that input/output of, e.g., image information will be performed stably and reliably.

As one example, excellent results were obtained with a two-inch magnetic disc under the following conditions:
disc rotational speed: 3600 rpm
c: 70–80 microns
d: 4–6 microns
e: 2.4 mm
s: 0.11° (6 min. 9 sec.)
t: 0.611° (36 min. 7 sec.)
r: 15 mm Thus, in accordance with the illustrated embodiment of the invention as described above, when the magnetic disc 60 is rotated and the two magnetic gaps 3, 4 of the inner head 20 and the two magnetic gaps 1, 2 of the outer head 30, for a total of four heads, contact or approach the recording surface 61 of the disc, the four magnetic gaps 1, 2, 3, 4 all contact or approach the recording surface 61 of the magnetic disc 60 in substantially the same manner. This allows stable input/output of image information.

As many apparently widely different embodiments of the present invention can be made without departing from the spirit and scope thereof, it is to be understood that the invention is not limited to the specific embodiments thereof except as defined in the appended claims.

What we claim is:

1. A magnetic disc drive for a magnetic disc having a recording/playback surface, comprising:
    a carriage movable radially of the magnetic disc;
    a rotary shaft with which the magnetic disc is engaged;
    a first magnetic head provided on said carriage and having a surface on which at least two magnetic gaps are provided; and
    a second magnetic head provided on said carriage and having a surface of which at least two magnetic gaps are provided;
    said first and second magnetic heads being spaced apart from each other radially of the magnetic disc by a first predetermined distance, said first magnetic head being located closer to said rotary shaft than said second magnetic head;
    said first magnetic head being tilted at a first predetermined angle toward said rotary shaft;
    said second magnetic head being tilted at a second predetermined angle away from said rotary shaft;

the magnetic gaps provided on said first and second magnetic heads being brought into contact with the recording/playback surface of the magnetic disc when said disc is rotated by said rotary shaft.

2. The magnetic disc drive according to claim 1, wherein said first magnetic head is provided on said carriage in such a manner that the surface of said first magnetic head having the magnetic gaps projects beyond the recording/playback surface of the magnetic disc by a second predetermined distance, and said second magnetic head is provided on said carriage in such a manner that the surface of said second magnetic head having the magnetic gaps projects beyond the recording/playback surface of the magnetic disc by a third predetermined distance smaller than said second predetermined distance.

3. The magnetic disc drive according to claim 1, further comprising a magnetic head adjustment mechanism for mounting said first and second magnetic heads on said carriage, said magnetic head adjustment mechanism having means for independently adjusting said first predetermined amount, said second and third predetermined distances, and said first and second predetermined angles.

4. The magnetic disc drive according to claim 1, wherein said magnetic gaps provided on said first and second magnetic heads are for both recording and playback.

* * * * *

UNITED STATES PATENT AND TRADEMARK OFFICE
CERTIFICATE OF CORRECTION

PATENT NO. : 4,933,793

DATED : June 12, 1990

INVENTOR(S) : Ichinose et al.

It is certified that error appears in the above-identified patent and that said Letters Patent is hereby corrected as shown below:

On the title page:

In [75] Inventors: "Katsuori Murata" is changed to --Katsunori Murata--.

Signed and Sealed this

Twenty-fourth Day of September, 1991

*Attest:*

HARRY F. MANBECK, JR.

*Attesting Officer*  *Commissioner of Patents and Trademarks*